United States Patent [19]
Michalik

[11] Patent Number: 5,865,119
[45] Date of Patent: Feb. 2, 1999

[54] SOUNDPROOFING

[75] Inventor: Horst Bernhard Michalik, Höchberg, Germany

[73] Assignee: Koenig & Bauer-Albert Aktiengesellschaft, Wurzburg, Germany

[21] Appl. No.: 913,359

[22] PCT Filed: Mar. 12, 1996

[86] PCT No.: PCT/DE96/00439

§ 371 Date: Sep. 17, 1997

§ 102(e) Date: Sep. 17, 1997

[87] PCT Pub. No.: WO96/29537

PCT Pub. Date: Sep. 26, 1996

[30] Foreign Application Priority Data

| Mar. 18, 1995 | [DE] | Germany | 19509975.3 |
| May 3, 1995 | [DE] | Germany | 19516178.5 |

[51] Int. Cl.⁶ ............................................... B41F 1/34
[52] U.S. Cl. .................. 101/480; 400/690.4; 181/295
[58] Field of Search .................. 400/690.4; 101/480; 181/284, 287, 295

[56] References Cited

U.S. PATENT DOCUMENTS

| 4,578,902 | 4/1986 | Niekrasz et al. | 49/70 |
| 4,637,196 | 1/1987 | Berner et al. | 53/77 |
| 5,178,069 | 1/1993 | Rodi | 101/480 |
| 5,306,082 | 4/1994 | Karlin et al. | 312/405 |

FOREIGN PATENT DOCUMENTS

| 0 138 053 | 4/1985 | European Pat. Off. . |
| 0 321 632 | 6/1989 | European Pat. Off. . |
| 0 417 465 | 3/1991 | European Pat. Off. . |
| 2 359 271 | 2/1978 | France . |
| 72 43 922 | 3/1975 | Germany . |
| 34 23 272 | 1/1986 | Germany . |
| 90 07 329.0 | 3/1991 | Germany . |
| 94 06 462.8 | 8/1994 | Germany . |

*Primary Examiner*—Edgar Burr
*Assistant Examiner*—Dave A. Ghatt
*Attorney, Agent, or Firm*—Jones, Tullar & Cooper, P.C.

[57] ABSTRACT

Soundproofing of a machine, such as a rotary printing pres, is provided by a plurality of soundproofing doors. Each of these doors is provided with a hinge at each of its four corners. The doors can each be selectively pivoted open or closed about either of two separate pivot axes or can be locked in place.

6 Claims, 5 Drawing Sheets

SOUNDPROOFING

FIELD OF INVENTION

The invention relates to soundproofing for a machine.

DESCRIPTION OF THE PRIOR ART

It is known from DE-Gm 90 07 329.0 to arrange sound-absorbing separating walls vertically between two adjoining print units, or between a print unit and a folding device, and to orient these walls with their sound absorbing means toward the above mentioned sound emission sources.

It is disadvantageous in connection with these protective devices that it is necessary to dismantle the sound-proofing device in an awkward manner for the purpose of maintenance and adjustment work.

FR-A-2359271 describes doors for the cargo space of a semi-trailer. These doors can be selectively pivoted around a right or left pivot axis.

SUMMARY OF THE INVENTION

The invention is based on the object of creating soundproofing for a machine or parts of a machine, which allows easy access.

In accordance with the invention this object is attained by the provision of soundproofing for a rotary printing press. This soundproofing has at least one door with a lining of a soundproofing material. This door has both left and right vertical pivot axes and can be selectively pivoted about either one of these two axes.

The advantages which can be attained by means of the present invention consist in particular in that, because of its division, the protective device for protection against sound and contact can be quickly removed without additional aids by one person for performing maintenance, adjustment and repair work. In the process it is only necessary, following the required insertion or removal of hinge bolts, to pivot the respective parts of the soundproofing around one of their longitudinal axes in order to make a part of the contact protection, behind which the corresponding components are located, accessible and to subsequently dismantle it. Possibly only the cover of a control opening needs to be removed. Because of the pivotability of the doors, a necessary access width is assured.

BRIEF DESCRIPTION OF THE DRAWINGS

A preferred embodiment of the invention is represented in the drawings and will be described in more detail in what follows.

Shown are in.

DETAILED DESCRIPTION OF THE PREFERRED EMBODIMENT

Figure 1:
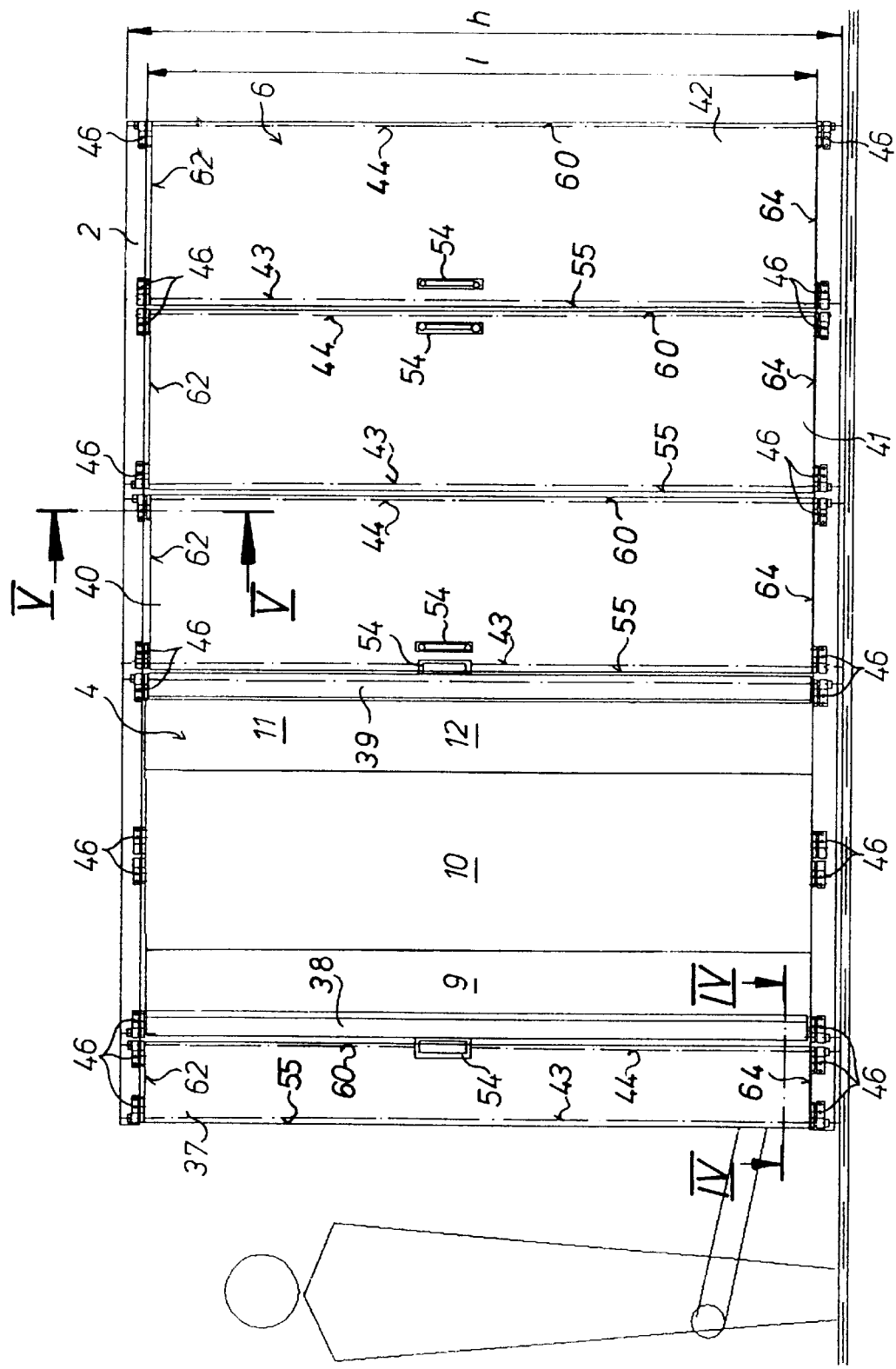
FIG. 1, a front view of a protective device in accordance with the present invention with partially opened portions of the soundproofing, and with a view of the portions of the contact protection plate disposed behind the soundproofing on a folding device of a web-fed rotary printing press, for example, FIG. 2, a representation analogous to FIG. 1, but with the contact protection plate partially opened and with a view of the gear elements of the folding device, FIG. 3, a front view of the protective device with closed soundproofing and a representation, by means of dashed lines, of the elements of the contact protection plate located behind the soundproofing, with a representation, by means of dashed lines, of fastening strips as well as the moldings of the lateral frames, FIG. 4, a section IV - IV in accordance with FIG. 1, with an enlarged representation of the hinge arrangement of the doors of the soundproofing on the lateral frame, FIG. 5, a section V—V in accordance with FIG. 1, with an enlarged representation of a cross section of the protective device as well as of the lateral frame with the gear chamber.
Figure 2:
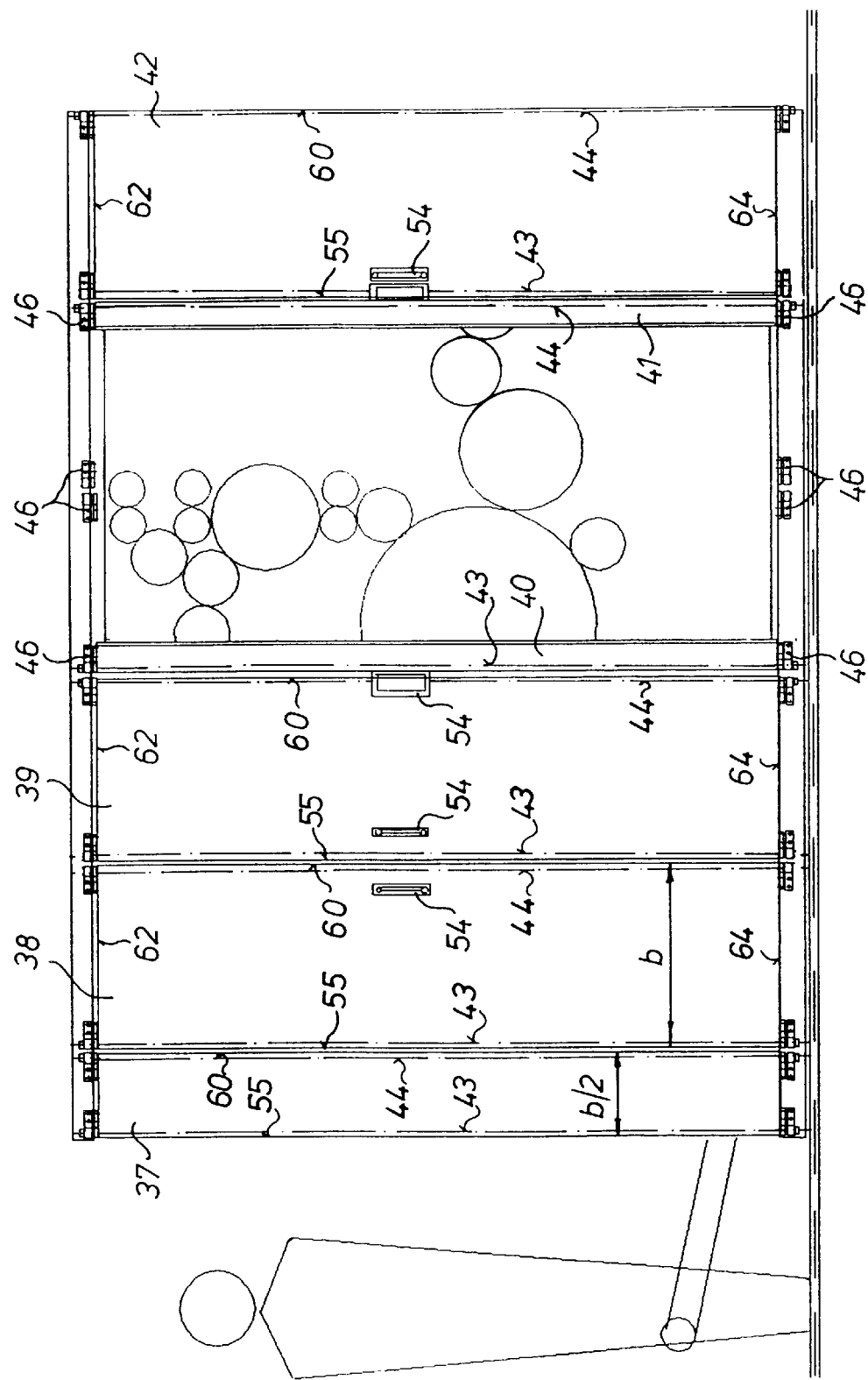
Figure 3:
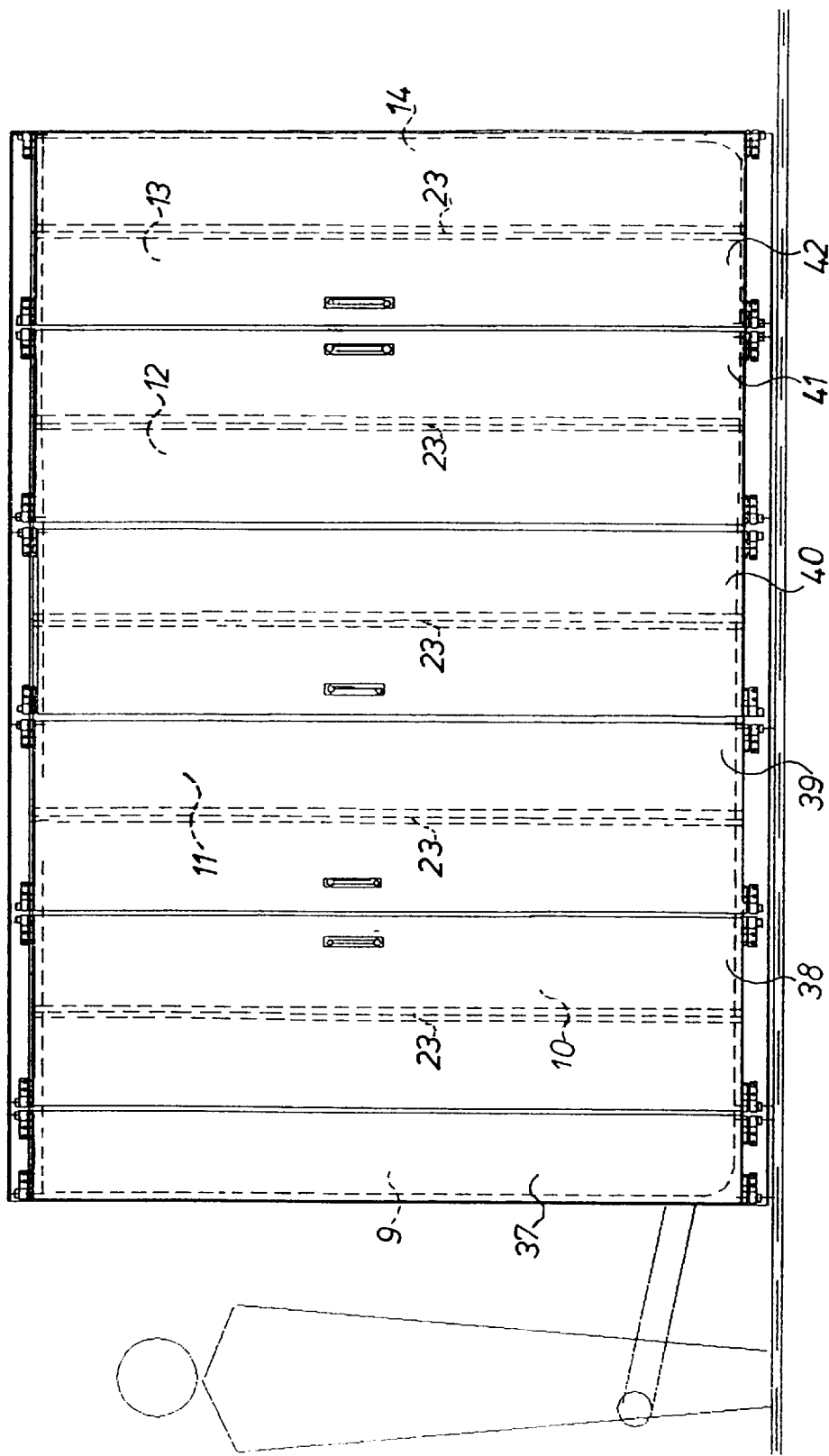
Figure 4:
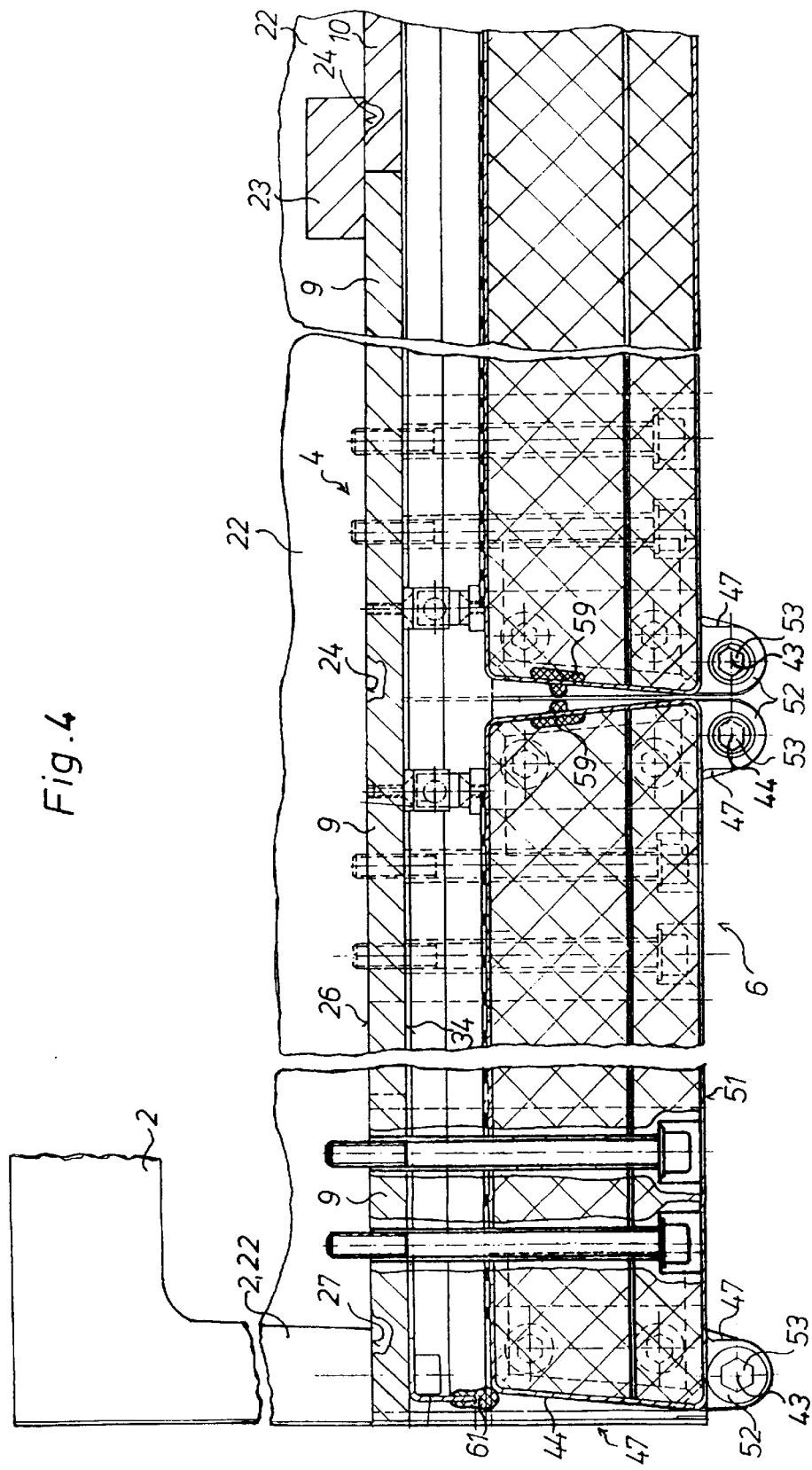
Figure 5:
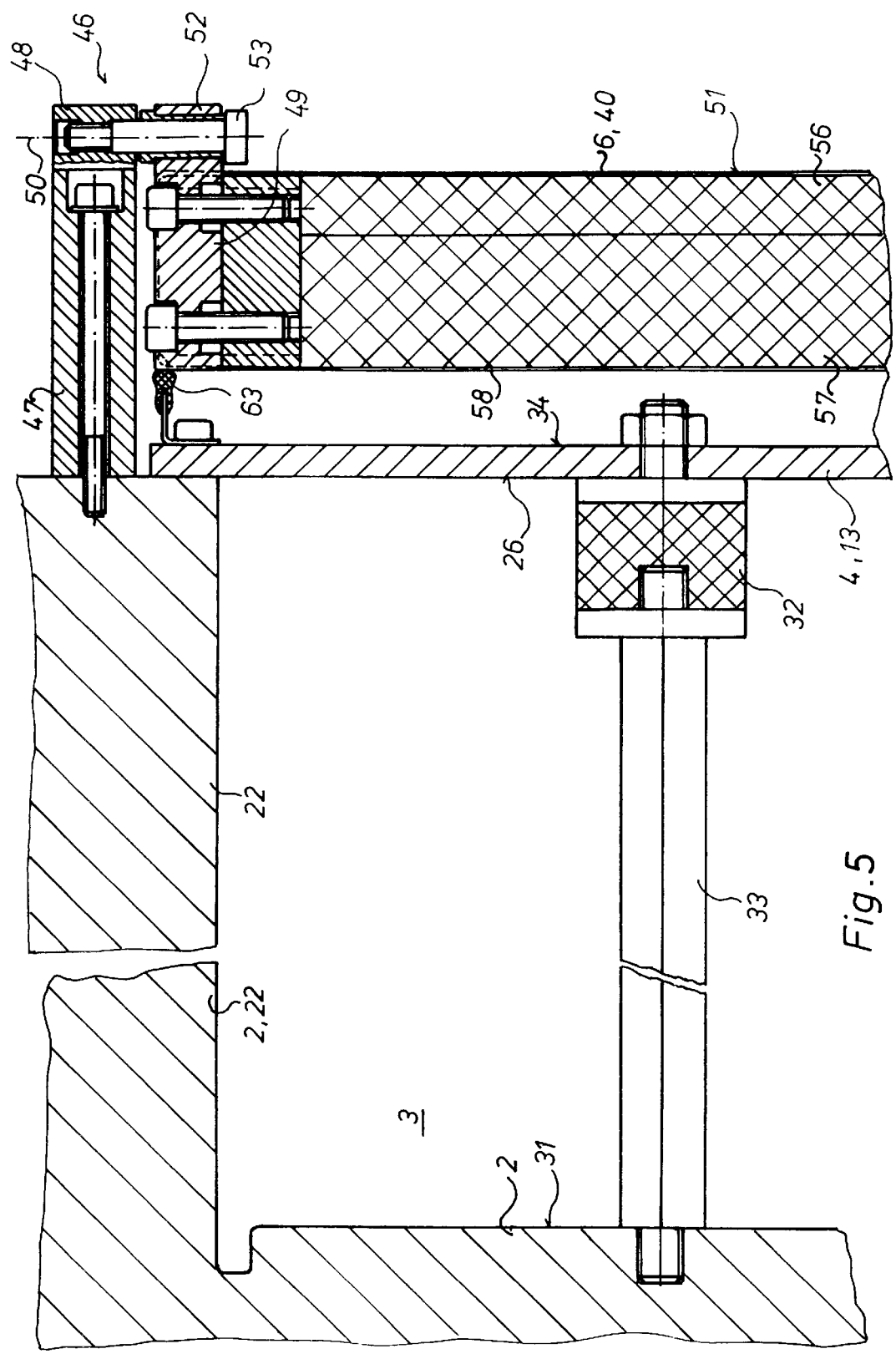

A protective device 1 for covering, for example, a gear chamber 3 located in a lateral frame 2, as seen in FIG. 5, in a folding device of a rotary printing press, is shown generally in FIG. 1, and consists of a multi-piece contact protection plate, identified as a whole by 4, and a multi-piece soundproofing door, identified as a whole by 6, which can be handled independently of the contact protection plate 4. The reference arrows for the plates 4, and for the doors 6 in this case respectively point to only one part of the plate 4 or the doors 6, as show in FIG. 1. The protection plate 4 consists of several mainly rectangular plate elements 9, 10, 11, 12, 13 of equal width "b," as seen in FIG. 2, and a right element 14 of one half the width b, wherein the elements 9 to 14 can each be of different length. The length of the elements 9 to 14 is a function of the height or the shape of the gear chamber 3 at the respective fastening location of the parts 9 to 14. On their vertically extending long sides or their horizontally extending transverse sides, the elements 9 to 14 of the contact protection plate 4 are fastened by means of bolts, not represented, in an oiltight manner on so called "moldings" 22 of the lateral frame 2 or on vertically extending holding strips 23, as seen primarily FIGS. 3 and 4. On their ends, the holding strips 23 are interlockingly connected with the moldings 22 or other parts of the lateral frame 2. A support surface 24 of the holding strip 23 for the inner face or side 26 of the plate elements 9 to 14 of the contact protection plate 4, which is close to the gear, is located on one level with a support surface 24 of the molding 22 of the lateral frame 4, as is shown in FIG. 4. Each element 9 to 14 of the contact protection plate 4 can have one or several control openings, which can be closed oiltight. Know vibration damping elements 32, as seen in FIG. 5, can be arranged between a bootom surface 31 of the gear chamber 3 and the inner face or side 26 of the elements 9 to 14 of the contact protection plate 4, which is close to the gear, and are interlockingly connected with the bottom surface 31, and the plate 4. Each vibration damping element 32 is suitably provided with an external or internal thread on its two sides and is respectively arranged on a stud bolt 33, again as seen in FIG. 5. The plate elements 9 to 14 of the contact protection plate 4, which are preferably made of a light metal, are prestressed by the arrangement of such vibration-damping elements 32, 33 at several locations of the gear chamber 3, which is used as a reduction of a sound expansion from the body as well as the air.

The multi-piece soundproofing 6 is disposed spaced from the outer face or side 34 of the plate elements 9 to 14 of the contact protection plate 4, which are remote from the gear. The soundproofing 6 consists of a plurality of rectangular doors 37, 38, 39, 40, 41, 42 of equal length "l," and which are arranged next to each other on the lateral frame 2. The respective soundproofing doors 37 to 42 are arranged pivotable around their left or right pivot axes 43, 44, wherein the pivot axes 43, 44 respectively extend parallel with a left and right long side 55, 60 of each door 37 to 42. In this way, the doors 37 to 42 are arranged on the lateral frame 2, selectively pivotable around one of their respectively vertically extending long sides 44, by means of hinges 46. The length "l" of the doors 37 to 42 of the soundproofing 6 approximately corresponds to a structural height "h" of the gear chambers 3 of the folding device. The doors 38, 39, 40, 41, 42 of the soundproofing 6 have approximately the same width "b" as the plate elements 10 to 14 of the contact protection plate 4. The left door 37 of the soundproofing 6 has half the width "b," which results in a covering by half a width "b" of the contact protection plate 4 arranged behind it. This is advantageous in that, for example when pivoting the doors 38, 39 of the soundproofing 6 around their left or around their right pivot axis 43, 44, a component located behind the element 10 of the contact plate 4, for example the drive of a folding jaw cylinder, is easily accessible after removing the plate element 10. Respectively one width "b" of the plate elements 9 to 14 and doors 38 to 42 corresponds at least to half the diameter "d" of the largest rotating element of the folding device, for example a folding jaw cylinder or a collection cylinder or their drive wheels.

The hinges 46 each respectively consist of a hinge element 47, fixed in place on the lateral frame 22, which receives a threaded bushing 48 on its end remote from the lateral frame, whose pivot axis 50 extends vertically. A second hinge element 49, respectively fastened at the corners of every door 37 to 42 of the soundproofing 6, has a bushing 52 on the exterior 51 of the soundproofing 6, which is remote from the gear chamber, whose axis of rotation is aligned with the pivot axis 50 of the threaded bushing 48. At least in the position of rest of the doors 37 to 42 of the soundproofing 6, both bushings 48, 52 are connected by a threaded bolt 53 which acts as a removable hinge pin. Respectively, one threaded bolt 53 has been inserted in all four corners of each of the doors 37 to 42 of the soundproofing 6 at rest. If now, as represented in FIG. 1, the doors 38, 39 of the soundproofing 6 are to be opened, the threaded bolts 53 of the hinges 46 located below and above the element 10 of the contact protection plate 4 are removed and in this way the doors 38, 39 of the soundproofing 6 act as doors fastened on the left or the right, respectively. Thus each door 37 to 42 can be releasable around its left or right pivot axis 43, 44, or lockable. The same can be performed with the doors 40, 41 of the soundproofing 6 as seen in FIG. 2. For operation, each door 37 to 42 of the soundproofing 6 can be equipped with an operating handle 54, which can be interlockingly connected with the respective door 37 to 42. A locking device, not shown, can be respectively provided behind the operating handles 54; i.e., on the side of the doors 37 to 42 of the soundproofing 6 which is close to the gear chamber, which can be magnetically operated and cooperates with the plate elements 9 to 14 of the contact protection plate 4. It is also possible to remove each door 37 to 42 from the soundproofing 6 by respectively removing the four threaded bolts 53 for each door 37 to 42 from the hinges 46.

The left and right vertical pivot axes 43, 44 can extend in the vicinity of the left and right long sides 55, 60 of each door 37 to 42, as shown in FIG. 2. It is also possible for the left and right vertical pivot axes 43, 44 to be coincident with the left and right long sides 55, 60 of each door 37 to 42.

Each door 37 to 42 of the soundproofing 6 consists of a beveled sheet metal element and contains a multi-layered soundproofing lining 56, 57, which is respectively held and protected by a perforated sheet metal plate 58 on the side of the soundproofing 6, which is close to the gear chamber, all as seen in FIG. 5.

Rubber sealing strips 59, as seen in FIG. 4 are respectively arranged on the long sides 55, 60 of the doors 37, 42, and act on each other. Rubber sealing strips 61, as also seen in FIG. 4 can also act on the exterior long sides 55, 60 of the doors 37, 42, which border the soundproofing 6 and are arranged fixed on the lateral frames or fixed on the contact protection plate. In the same way, rubber sealing strips 63, as seen in FIG. 5 can act on the upper and lower sides 62, 64 of the doors 37 to 42 of the soundproofing, which are arranged fixed on the lateral frames or fixed on the contact protection plates.

While a preferred embodiment of soundproofing for a machine, such as a printing press in accordance with the present invention has been set forth fully and completely hereinabove, it will be apparent one of skill in the art that a number of changes in, for example, the specific printing press equipment, the size of the soundproofing doors, the particular material used and the like may be made without departing from the true spirit and scope of the present invention which is accordingly to be limited only by the following claims.

What is claimed is:

1. A soundproofing assembly for a rotary printing press comprising:

at least one frame defining at least one chamber, said chamber containing a printing press component;

a plurality of doors secured to said at least one frame;

a soundproofing lining carried by each of said doors;

first and second spaced pivot axes for each of said doors;

a multi-element contact protection plate positioned between a printing press component in said chamber and said plurality of doors;

a plurality of door hinge elements secured to each one of said plurality of doors;

a plurality of frame hinge elements secured to said at least one frame, selected ones of said door hinge elements and said frame hinge elements being alignable with each other along said first and second spaced pivot axes for each of said doors; and selectively removable hinge pins receivable in said aligned ones of said door hinge elements and said frame hinge elements to pivot each of said doors selectively about said first and second pivot axes to expose selected portions of said multi-element contact protection plate.

2. The soundproofing of claim 1 wherein each of said doors has first and second sides and wherein said first and second pivot axes extend parallel with said first and second sides.

3. The soundproofing of claim 1 wherein each of said doors has first and second sides and wherein said first and second pivot axes are coincident with said first and second sides.

4. The sound proofing of claim 1 wherein each of said doors has first and second sides and wherein said first and second pivot axes are located in the vicinity of said first and second sides.

5. The soundproofing of claim 1 wherein said chamber has a chamber height and further wherein each of said doors has a door height, said door height corresponding to said chamber height.

6. The soundproofing of claim 1 wherein at least one of said doors is secured to said frame offset with respect to an element of said multi-element contact protection plate.

* * * * *